US006842762B2

United States Patent
Raithel et al.

(10) Patent No.: US 6,842,762 B2
(45) Date of Patent: Jan. 11, 2005

(54) METHOD FOR DOCUMENTATION OF DATA FOR A VEHICLE

(75) Inventors: Mathias Raithel, Grafenau (DE); Sandra Schneider, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 147 days.

(21) Appl. No.: 09/989,519

(22) Filed: Nov. 21, 2001

(65) Prior Publication Data

US 2002/0087240 A1 Jul. 4, 2002

(30) Foreign Application Priority Data

Nov. 21, 2000 (DE) .......................................... 100 57 638

(51) Int. Cl.⁷ .......................... G06F 17/00; G01M 17/00
(52) U.S. Cl. .......................... 707/104.1; 701/33; 701/35
(58) Field of Search .......................... 707/104.1, 1, 10; 701/29, 34, 35

(56) References Cited

U.S. PATENT DOCUMENTS

| | | | | |
|---|---|---|---|---|
| 5,365,436 A | * | 11/1994 | Schaller et al. | ................ 701/33 |
| 6,208,919 B1 | * | 3/2001 | Barkesseh et al. | ............. 701/35 |
| 6,434,455 B1 | * | 8/2002 | Snow et al. | ................... 701/33 |
| 6,754,485 B1 | * | 6/2004 | Obradovich et al. | ...... 455/414.1 |
| 2002/0103727 A1 | * | 8/2002 | Tait et al. | ...................... 705/28 |
| 2004/0039500 A1 | * | 2/2004 | Amendola et al. | ............. 701/29 |

FOREIGN PATENT DOCUMENTS

| | | |
|---|---|---|
| DE | 19615105 | 10/1997 |
| DE | 19850133 A1 | 5/1999 |
| DE | 19853000 | 6/1999 |
| DE | 19839310 | 5/2001 |

* cited by examiner

Primary Examiner—Uyen Le
(74) Attorney, Agent, or Firm—Crowell & Moring LLP

(57) ABSTRACT

A method for documentation of data for a vehicle, with the data being stored in a data memory (2) in the vehicle (1), the data in the data memory (2) being updated in the event of changes, and this data being transmitted via a wireless data transmission device (4) to a control center (5) outside the vehicle (1), in which case the control center (5), triggered by an initiation signal, passes on the data to a configuration documentation server (7), the data is stored in a database (6), in particular in a chronological sequence and broken down into products, in order to record the configuration standard outside the vehicle (1) for replacement of products on the vehicle (1).

5 Claims, 1 Drawing Sheet

METHOD FOR DOCUMENTATION OF DATA FOR A VEHICLE

BACKGROUND AND SUMMARY OF THE INVENTION

This application claims the priority of German Patent Application No., 10057638 filed Nov. 21, 2000, the disclosure of which is expressly incorporated herein by reference.

The invention relates to a method for documentation of data for a vehicle, with the data being stored in a data memory in the vehicle, the data in the data memory being updated in the event of changes, and this data being transmitted via a wireless data transmission device to a control center outside the vehicle. The invention also relates to an apparatus for carrying out this method.

German Patent DE 198 53 000 A1 discloses a method and an arrangement for supplying motor vehicles with data. The data is used for operating closed-loop and open-loop control systems. A wireless data transmission device between the vehicle and a control center insures that data can be transmitted, checked or interchanged. Such data is used for operating, for monitoring, for updating and for technical diagnosis and analysis, for example, of the brake system, of the running gear, of the air pressure for the individual wheels, etc. The major aspect of this method is telediagnosis, that is to say wireless transmission of monitoring data, which is recorded by the control center at regular time intervals. Then, if necessary, the control center initiates corrective measures, as is known from diagnosis procedures during visits to workshops.

This method has the problem that the control center always has to first make contact with the vehicle in order to make it possible to ensure access to the data for that vehicle. Furthermore, in the event of radio contact, only a narrow bandwidth is available for a short time period for wireless data transmission. It is therefore necessary to make a selection from the available data, that is to say the available data is not all transmitted.

Furthermore, P10037397.6 discloses a method for loading software into an intended appliance, and a vehicle control system for carrying out the method, although the method is subject only to minor requirements for the performance of the intended appliance. In this case, the loading of a software module is subdivided into various partial steps. A step is defined, inter alia, for a configuration manager, with a compatibility check being carried out from the compatibility information stored directly with the software, regardless of whether such information is still up-to-date.

The invention is based on the object of providing a method which simplifies the updating of products and compatibility checking of the products in the vehicle, and/or stores data corresponding to the product configuration in a control center outside the vehicle, and at the same time ensures that such data represents an up-to-date standard and its chronological sequence.

According to the invention, the data in the data memory in the vehicle is updated in the event of changes, that is to say in particular on exchange, addition, replacement and removal of products. Triggered by an initiation signal, the data is then passed on from the control center to a configuration documentation server. In a second step, this data is stored by the configuration documentation server in a database in chronological sequence, and is broken down into products, in particular product parts and/or technical appliances and/or software.

The invention has identified that, in the case of the method for documentation, the storage of the configuration data in the database is broken down on the basis of the various products, such as product parts, hardware or software. The configuration of the products in the vehicle is thus recorded and can be revised by means of search algorithms for evaluations of individual products. In addition, this data can be checked at regular intervals to ensure the quality and the latest product standard in the vehicle.

Should it be necessary to break down the configuration data on the basis of the individual vehicle, a unique identifier for the vehicle must be transmitted during the wireless data transmission from the vehicle to the control center, and must be stored with the data. The identifier may, for example, be a vehicle identification number or any other type of unique code. In addition, the vehicle can also be identified by an individually assigned IP address or telephone number, which is checked when setting up a connection and which is likewise stored with the data.

Furthermore, the storage of the data independently of and outside the vehicle ensures monitored access to this data at any time by the vehicle manufacturer, the service station, etc. One major advantage of the invention is that there need not be any radio contact with the vehicle at the moment when the requirement for evaluation occurs. The data can be read at any desired time from the data memory within the vehicle, and can be stored independently of and outside the vehicle. Furthermore, this method makes it possible to ensure that, if the data memory in the vehicle is lost as a result of an accident or manipulation, the configuration data for the relevant vehicle is still available. In particular, efficient and revision-proof back-up systems for servers and databases make it possible to ensure that data loss is impossible.

A further advantage of the method according to the invention for vehicle documentation is the protection of evidence in the event of product liability, since the data is stored in chronological sequence in the database, that is to say with additional date information. This likewise allows the history of the products in the vehicle to be evaluated, that is to say their configuration changes in the life cycle of the vehicle or of the product.

According to the invention, the data which is stored in a data memory in the vehicle is sent to a control center, triggered by means of an initiation signal, by means of wireless data transmission devices, and the control center passes on this data to a configuration documentation server for storage in a database. The compatibility requirements for the products, in particular product parts and/or software, are stored on compatibility documentation servers in databases. The documentation servers have interfaces for communication. A compatibility check for the products in the vehicle, in particular product parts and/or software, can thus be carried out by means of the data from the documentation servers.

The invention has identified the fact that a compatibility documentation server is preferably provided which stores information about products, in particular product parts and/or technical appliances and/or software, with such information indicating specific interrelationships which need to be met. The data in the configuration documentation server is thus used to carry out a compatibility check for the appropriate configuration standards in the vehicle.

Central storage of the compatibility information on the compatibility documentation server has the advantage that this information can be updated quickly and errors resulting from obsolete compatibility data, which was entered at the time of delivery of the product, in particular product parts and/or software, are avoided.

In addition, the individual configuration data for the vehicle, i.e., the configuration documentation, and the compatibility requirements for the products, for example the product parts and/or software, i.e., the compatibility documentation, are available via compatibility testing interfaces, for checking the compatibility of the products in a vehicle.

In one development of the invention, the initiation signal for wireless data transmission is triggered either by the control center and/or by a control unit on the vehicle and/or by the updating of the data memory in the vehicle. The check, for example by the control center, can be carried out regularly, in order to obtain validated information about the standard of the vehicles.

If a manufacturer has the obligation to document all the configuration standards of a vehicle even after it has been sold, then it is possible to link this documentation to the updating of data in the data memory in the vehicle. This procedure could be expanded such that the customer confirms the transmission of the data by means of a control unit in the vehicle, or rejects it for secrecy reasons.

The data transmission for the compatibility check can be initiated by the control center and/or by a control unit on the vehicle and/or by updating of the data memory in the vehicle. Checking, for example by the control center in the works or a service station, may be necessary when changes have been recorded in the compatibility documentation servers. If any compatibility problems with specific configuration data are found, this vehicle can be specifically recalled.

The control unit on the vehicle allows the driver of the vehicle and/or the workshops in which the vehicle is maintained to carry out the compatibility test. If the compatibility test is coupled to the updating of the data in the data memory in the vehicle, then configuration errors can be found immediately, and procedures to overcome them can be carried out specifically.

In another development of the invention, once the data has been successfully stored in the database in the configuration documentation server, this data can be deleted in the data memory in the vehicle. This can be done, for example, by immediately deleting the data that has been successfully passed to the configuration documentation server as soon as the transfer has been correctly acknowledged or by such data being given a special identifier, and by such specially identified data being deleted at regular intervals. This has the advantage that the data memory in the vehicle can be kept small. Furthermore, this method can be used to ensure that only the updated configuration data for the vehicle is sent to the control center. This has the advantage that the narrow bandwidth for data transmission is used optimally.

Updates to products and/or product parts and/or software in the vehicle are preferably allowed only after the data has been successfully stored in the database in the configuration documentation server. This method has the advantage of preventing changes to the vehicle which cannot be documented.

As an alternative, updates to products and/or product parts and/or software in the vehicle can be specifically permitted without the necessity for the data to be stored in the database in the configuration documentation server. Further updating is then permissible only once the data has been successfully stored in the database in the configuration documentation server. This prevents discrepancies between the vehicle and the configuration documentation server.

Other objects, advantages and novel features of the present invention will become apparent from the following detailed description of the invention when considered in conjunction with the accompanying drawings.

BRIEF DESCRIPTION OF THE DRAWINGS

The sole FIGURE illustrates an apparatus for carrying out the method.

DETAILED DESCRIPTION OF THE PREFERRED EMBODIMENT

Figure 1:
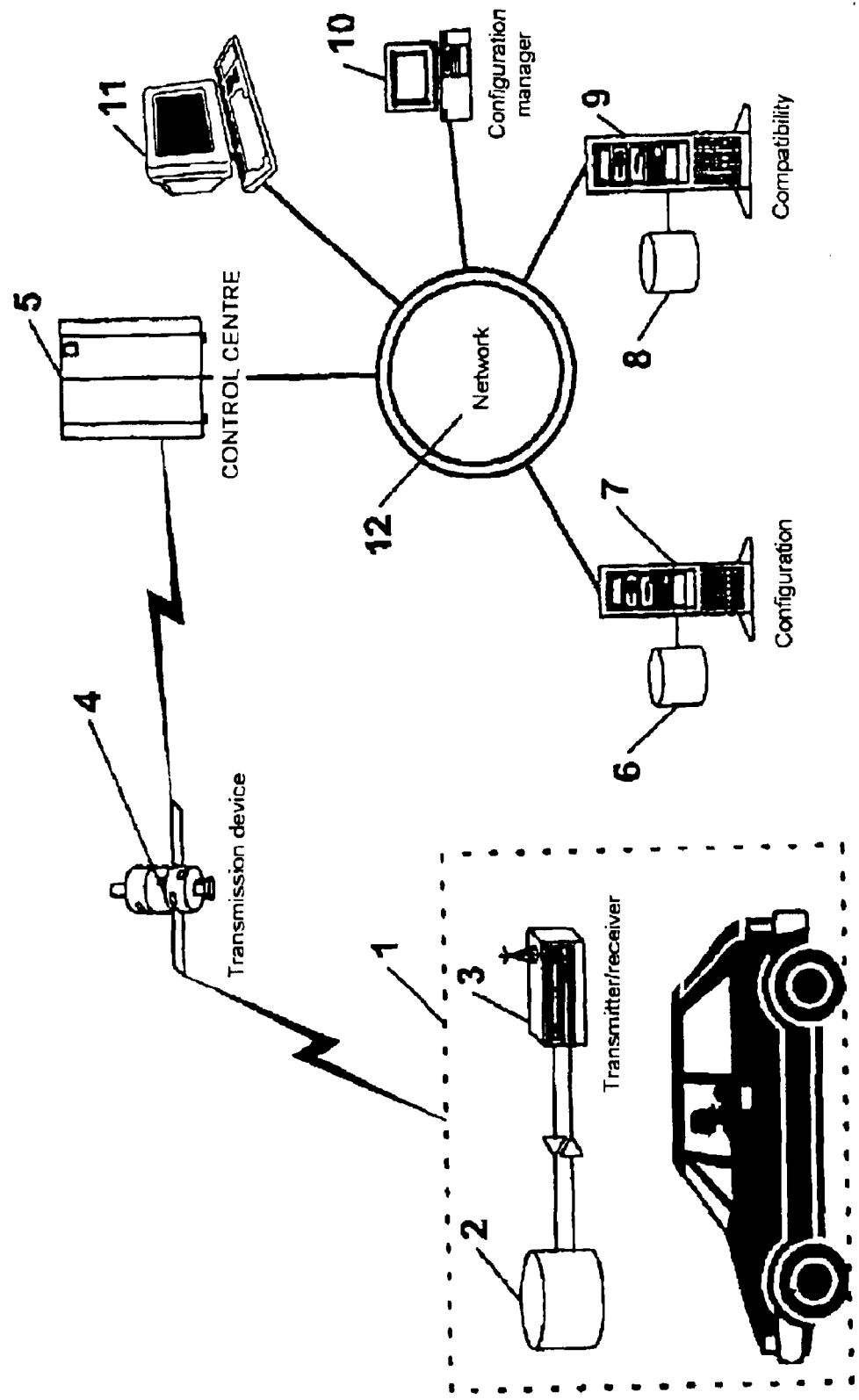

A vehicle 1 has a data memory 2, in which configuration data relating to products, in particular product parts and/or technical appliances and/or software, is stored. The configuration data is recorded automatically by the data memory 2, as soon as a change is carried out to the products in the vehicle 1.

If the products contain software, the configuration data has an updating date, a designation for the software module, details of an intended appliance, a version standard and, optionally, the compatibility information which is already contained in the software.

The data is read from the data memory 2 and is communicated to the control center 5 via a transmitting/receiving unit 3 by means of a wireless transmission device 4, which may be, for example, electromagnetic radiation via a satellite. The control center 5 passes on the received data to a configuration documentation server 7.

The control center 5 may, for example, be a call center, from which the data is passed onto the appropriate points, in particular the manufacturer, workshops, customer center, vehicle 1, and documentation servers 7, 9. The control center 5 can be set up as a remote access point in a similar way to the dialing-in points for Internet services, thus passing on the incoming data automatically.

The control center 5 is coupled directly to a network 12, as a result of which all the subscribers to this network 12 have access to the individual documentation servers 7, 9, to the configuration manager 10 and/or to the control center 5. The subscribers to the network 12 also include the works, the service stations, the workshops and/or suppliers, in each case coupled via an already existing network 12 of a manufacturer.

The configuration documentation server 7 uses a database 6 to store the configuration data arriving from the data memory 2 in the vehicle. The data is stored in chronological sequence, i.e., on the basis of the time at which it is entered in the database. This is ensured by storing the appropriate date at which the updating of the vehicle took place, together with the data. This data is now available via the terminal 11 to every subscriber to the network 12, in particular to the control center 5 and/or to the documentation servers 7, 9, and can be used for fault tracing, for the protection of evidence for product liability, and for statistical purposes, etc.

The control center 5 can initiate a compatibility test via an electronic configuration manager 10 at any time. In this case, the electronic configuration manager 10 carries out a comparison between the configuration data 6 for the vehicle on the configuration documentation server 7 and the compatibility data in the database 8 in the compatibility documentation server 9.

If the products have software, a check is carried out, during this comparison, to determine whether a specific up-to-date software module X in the vehicle has any interrelationships with other appliances in the vehicle for a specific intended appliance Y with a specific version standard Z. Requirements for version standards of other software modules in the same intended appliance or other appliances are checked in the process. The information required for compatibility checking is already stored in the compatibility documentation server. The information indicates, for example, that the software module X requires the software module A in the version standard B in the intended appliance C in order to operate correctly. Furthermore, the configuration manager 10 uses the data from the configuration documentation server 7 to check whether the specified configuration has actually been implemented in the relevant vehicle.

In another embodiment the products are technical appliances, product parts or hardware. Data, in particular relating to the equipment fit and the characteristic parameters, is stored as configuration data. The configuration data for the product types include details relating to the date of updating, the manufacturer, type, size and position on the vehicle. The configuration manager 10 can compare the configuration data on the database 6 with the compatibility data on the database 8 to determine whether this product is compatible with this vehicle, that is to say whether it satisfies the operating and appliance-specific requirements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for documenting a vehicle data stored in a data member of the vehicle, wherein the stored data is grouped according to products of the vehicle and is updated in the event of changes, said method comprising the steps of:

transmitting said stored data group according to products of said vehicle via a wireless data transmission device to a control center outside the vehicle;

retransmitting, in response to an initiation signal, said transmitted data to a configuration documentation server and storing said transmitted data in a first database;

storing, as compatibility data, compatibility requirements for each of said products of said vehicle on a compatibility documentation server, separate from the configuration documentation server, in a second database;

performing a compatibility check for at least one of said products in the vehicle by means of the compatibility data in the compatibility documentation server; and checking configuration standards of said at least one of said products from outside said vehicle by communications between said configuration documentation server and said compatibility documentation server.

2. The method according to claim 1 comprising the further step of triggering the initiation signal for the wireless data transmission from the control center by one of a control unit on the vehicle and by updating of the data memory in the vehicle.

3. A method according to claim 1 further comprising the step of storing configuration standards relating to the products used in the vehicle, as standard data.

4. A method according to claim 1 further comprising the step of transmitting an enable signal from the control center to the vehicle after the data has been stored in the database in the configuration documentation server, in order to update the vehicle data in the data memory.

5. A method according to claim 4, further comprising the step of transmitting the enable signal after the compatibility test has been successfully completed.

* * * * *